United States Patent [19]
Bellamy et al.

[11] Patent Number: 5,855,352
[45] Date of Patent: Jan. 5, 1999

[54] HYDRAULIC ANTIVIBRATION SUPPORT

[75] Inventors: Alain Bellamy, Naveil; Denis Reh; Pascal Petit, both of Chateaudun, all of France

[73] Assignee: Hutchinson, Paris, France

[21] Appl. No.: 817,622

[22] PCT Filed: Oct. 27, 1995

[86] PCT No.: PCT/FR95/01425

§ 371 Date: Jun. 23, 1997

§ 102(e) Date: Jun. 23, 1997

[87] PCT Pub. No.: WO96/13675

PCT Pub. Date: May 9, 1996

[30] Foreign Application Priority Data

Oct. 27, 1994 [FR] France .................................. 94 12889

[51] Int. Cl.$^6$ .................................................. F16M 13/00
[52] U.S. Cl. .................... 248/634; 248/636; 248/638; 267/140.12
[58] Field of Search ..................... 248/562, 619, 248/621, 632, 634, 636, 638, 659, 580; 267/140.11, 140.12, 140.13, 140.5

[56] References Cited

U.S. PATENT DOCUMENTS

| | | | |
|---|---|---|---|
| 4,262,886 | 4/1981 | Le Salver et al. ...................... | 267/8 R |
| 4,767,106 | 8/1988 | Le Fol ................................. | 267/140.1 |
| 5,549,283 | 8/1996 | Bellamy et al. .................... | 267/140.12 |
| 5,556,071 | 9/1996 | Bellamy et al. ........................ | 248/634 |
| 5,741,001 | 4/1998 | Bellamy et al. ........................ | 248/634 |

FOREIGN PATENT DOCUMENTS

| | | |
|---|---|---|
| 0 012 638 A1 | 6/1980 | European Pat. Off. . |
| 0 172 700 A1 | 2/1986 | European Pat. Off. . |
| 0 236 199 A1 | 9/1987 | European Pat. Off. . |
| 0 342 680 A3 | 11/1989 | European Pat. Off. . |
| 0 556 076 A1 | 8/1993 | European Pat. Off. . |
| 0 556 076 B1 | 8/1993 | European Pat. Off. . |
| 0 646 735 A1 | 4/1995 | European Pat. Off. . |
| 2 622 269 A1 | 4/1989 | France . |
| 59-37348 A | 2/1984 | Japan . |
| 2 200 190 | 7/1988 | United Kingdom . |
| 2 207 214 | 1/1989 | United Kingdom . |
| 2 211 580 A | 7/1989 | United Kingdom . |

OTHER PUBLICATIONS

French Search Report dated 2 Jun. 1995, French Appl. No. FR 9412889.

International Search Report dated 21 Feb. 1996, International Appl. No. PCT/FR 95/01425.

Patent Abstract of Japan, vol. 12, Number 437 (M–765) (17 Nov. 1988), JP 63–172036 A, 15 Jul. 1988.

Patent Abstract of Japan, vol. 8, No. 140 (M–305) (29 Jun. 1984), JP 59–037348 A, 29 Feb. 1984.

*Primary Examiner*—Ramon O. Ramirez
*Assistant Examiner*—Long Dinh Phan
*Attorney, Agent, or Firm*—Marshall, O'Toole, Gerstein, Murray & Borun

[57] ABSTRACT

A hydraulic antivibration support comprising first and second rigid strength members (1, 2) in the form of a plate, and a bell-shaped elastomer body (3, 4) interconnecting the two rigid strength members and forming a working chamber (A) therebetween, and a compensation chamber (B) connected to the working chamber via a narrow channel (C) filled with liquid like the chambers. A hole (13) pierced in the plate is sealed by a flexible decoupling membrane (14) whose periphery is bonded to the rim of the hole by vulcanization.

4 Claims, 1 Drawing Sheet

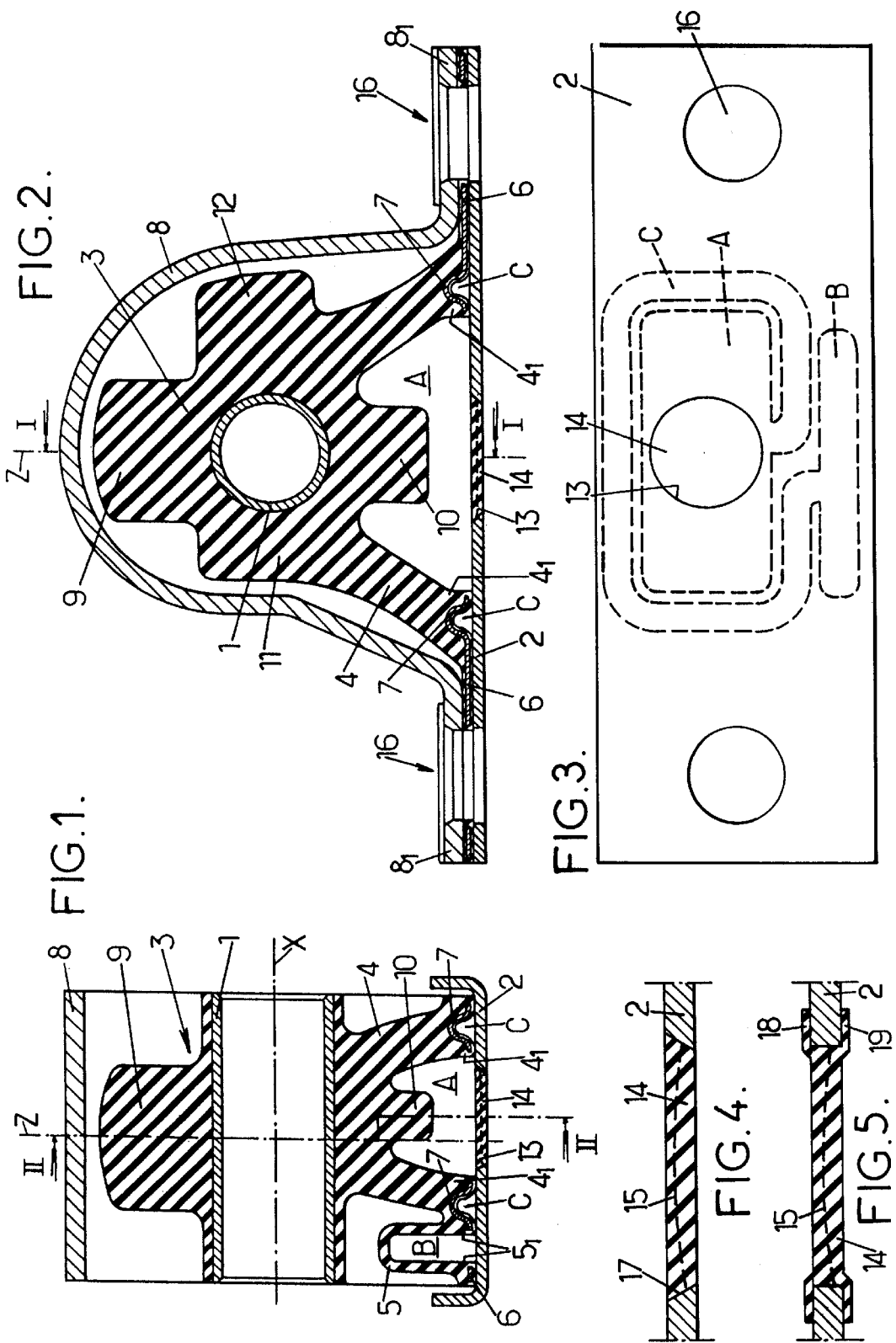

HYDRAULIC ANTIVIBRATION SUPPORT

The invention relates to hydraulic antivibration supports designed to be interposed for damping and connection purposes between two rigid elements such as the chassis and the engine of a vehicle, in order to damp vibratory motion between the two rigid elements, essentially along a main vibration direction.

More particularly, the invention relates to an antivibration support of this type, comprising first and second rigid strength members suitable for securing to respective ones of the two rigid elements to be united, and an elastomer body having a thick wall interconnecting the two rigid strength members and partially defining a working chamber, said thick wall being substantially bell-shaped, extending along the main vibration direction between a peripheral base secured to the second strength member and a crown secured to the first strength member, said elastomer body further including a freely-deformable thin wall which is integrally formed with the above-mentioned thick wall and which partially defines a compensation chamber that is in communication with the working chamber via a narrow channel, the two chambers and the narrow channel being filled with a liquid, the second strength member being a base plate which extends in a general plane that is substantially perpendicular to the main vibration direction and which has a "support" face secured in sealed manner with the elastomer body to co-operate therewith in defining the two chambers and the narrow channel.

Such a device is described in document EP-A-0 236 199, for example.

However, the device described in that document does not include a decoupling flap valve between the two rigid strength members for filtering small amplitude vibrations of relatively high frequency.

A particular object of the present invention is to provide a hydraulic antivibration support of the kind in question which has a decoupling flap valve, but which nevertheless is simple and relatively cheap.

To this end, according to the invention, a hydraulic antivibration support of the kind in question is essentially characterized in that its base plate is pierced by a hole in communication with the atmosphere and facing the working chamber, the hole being closed in sealed manner by a flexible membrane made of elastomer whose periphery is intimately bonded to the rim of the hole, the membrane being reinforced by a web made of non-deformable material that limits the displacement amplitude thereof.

In preferred embodiments of the invention, use is also made of one or more of the following dispositions:
  the membrane is formed so that deformation thereof is limited beyond a predetermined threshold by jamming;
  the rim of the hole is shaped, in particular by bevelling, so as to provide a membrane-receiving seat which is not entirely cylindrical; and
  the periphery of the membrane is extended by at least one lip that overlaps the rim of the hole.

Other characteristics and advantages of the invention appear from the following description of several embodiments thereof, given by way of non-limiting example, and with reference to the accompanying drawings.

In the drawings:

FIG. 1 is a section view of an embodiment of the invention, the section being on line I—I of FIG. 2;

FIG. 2 is a section view on line II—II of FIG. 1;

FIG. 3 is a view from beneath of the device of FIGS. 1 and 2; and

FIGS. 4 and 5 show in similar manner to FIG. 2 but on a larger scale, two respective variants of a detail of said figure.

The antivibration support shown in FIGS. 1 to 3 comprise two rigid metal strength members 1 and 2 which are interconnected by an elastomer body 3.

The first strength member 1 is tubular in the example shown, having a longitudinal axis X. More generally, the first strength member 1 may be in the form of an elongate member that is solid or hollow, and of section that is circular or otherwise.

The second strength member 2 is a plate referred to below as a base plate, which is generally plane in shape, at least in part, and which extends parallel to the axis X of the first strength member.

The elastomer body 3 is secured to the first strength member 1 by vulcanization. It has a thick wall 4 that is substantially bell-shaped, extending from a crown secured to the first strength member 1 to a peripheral base secured to the base plate 2 in a direction Z in which vibratory motion between the two strength members is to be damped. The direction Z is perpendicular to the axis X and to the general plane of the base plate 2, and it may be vertical, for example.

The thick wall 4 has sufficient compression strength to support a load applied to the first strength member 1 parallel to the axis Z and directed towards the base plate. This load may be greater than 15 kg, for example, and is generally much greater than that.

The peripheral base $4_1$ of the thick wall 4 is secured in sealed manner to the base plate 2, thereby defining a working chamber A. In the example shown, the chamber A is of rectangular horizontal section, but it could be of some other shape, in particular its horizontal section could be circular or oval.

In addition, the elastomer body 3 includes a flexible thin wall 5 which juxtaposes the thick wall 4 and which is bell-shaped, having a peripheral base $5_1$ which is also secured in sealed manner to the base plate 2, thereby defining a compensation chamber B.

The chamber B is rectangular in horizontal section in the example shown, but it could have some other shape.

The two chambers A and B communicate via a narrow channel C in the form of a groove made in the face of the elastomer body 3 that is pressed against the base plate 2, the edges of the groove being in sealed contact with the base plate 2.

The walls 4 and 5 do not share a common portion between the chambers A and B, apart from a connection between their bases $4_1$ and $5_1$.

In the example shown, the elastomer body 3 is molded over a perforated metal plate 6 disposed on the face of the elastomer body which is in contact with the base plate 2. Thus, the base plate 2 may be secured to the elastomer body by crimping said base plate 2 onto said perforated plate 6.

In addition, the perforated plate 6 has a groove or gutter 7 which accurately defines the shape of the narrow channel C.

The antivibration support of FIGS. 1 to 3 also includes a metal arch 8 which is rigidly secured to the base plate 2. The arch 8 surrounds the first strength member 1 and the elastomer body 3, and it extends parallel to the axis X.

In the example shown, the arch 8 is a folded plate covering all of the elastomer body, thereby protecting it from shocks from foreign bodies. This is advantageous insofar as the thin wall 5 is fragile and is exposed beside the thick wall 4.

The arch 8 has two lateral extensions $8_1$ on respective sides of the elastomer body 3. These lateral extensions cover respective portions of the perorated plate 8, which itself covers the second strength member. In addition, in each of the extensions 8₁, these three elements are pierced by a respective hole 16.

The holes 16 enable the antivibration support to be fastened to a rigid part by means of screws or bolts (not shown), and also contribute to holding together the various portions of the antivibration support by clamping the extensions 8₁ onto the plate 6 and the second strength member 2.

The elastomer body 3 has a first boss 9 extending parallel to the direction Z starting from the first strength member 1 and going away from the base plate 2. The boss 9 is adapted to come into abutment against the top portion of the arch 8, thereby limiting the displacement of the first strength member away from the base plate 2.

The elastomer body 3 further includes a second boss 10 extending from the first strength member 1 towards the base plate 2, parallel to the axis Z, and penetrating into the working chamber A. The second boss 10 is adapted to come into abutment against the base plate 2, thereby limiting the displacement of the first strength member towards the base plate.

Finally, the elastomer body has lateral bosses 11 and 12 that are substantially diametrically opposite about the first strength member 1 and that are adapted to come into abutment against the arch 8 when the first strength member is displaced substantially perpendicularly to the axis X and to the direction Z.

The chambers A and B and the narrow channel C are filled with liquid. When the two strength members 1 and 2 are subjected to relative vibratory motion, the thick wall 4 of the elastomer body deforms, thereby varying the volume of the working chamber A. These variations in volume cause liquid to be transferred between the chambers A and B via the narrow channel C, with variations in the volume of the working chamber A being compensated by complementary variations in the compensation chamber B, whose thin wall 5 is easily deformable.

In the vicinity of a particular frequency, which is generally lower than 20 Hz, and which depends essentially on the dimensions of the narrow channel C and on the density of the liquid in motion in said narrow channel, a resonance phenomenon occurs in the narrow channel C in association with the headlosses in said narrow channel, thereby giving rise to a high degree of damping of vibration between the two strength members 1 and 2.

The antivibration support also includes a decoupling flap valve for damping vibrations that are of small amplitude, e.g. less than 0.5 mm, and that are of relatively high frequency, e.g. greater than 20 Hz.

To this end, the base plate 2 is pierced with a hole 13 facing the working chamber A, and said hole 13 is closed in sealed manner by a flexible membrane 14 which separates the working chamber A from the ambient atmosphere.

The flexible membrane 14 is made of elastomer and its periphery is intimately bonded to the rim of the hole 13.

This bonding is preferably performed hot and under pressure, by in situ vulcanization of a membrane blank made of raw elastomer.

An extremely strong and completely leak-proof mechanical connection is thereby ensured between the membrane and the plate, which is necessary in order to prevent any of the liquid inside the support from escaping into the atmosphere.

In this case in particular, it would not be safe to use simple crimping or clamping as previously known for fixing the membrane.

In order to limit the amplitude of membrane deformation, an inextensible web 15 is advantageously embedded therein, the measurements of the web being such that, at rest, said web is not exactly plane in shape, thereby allowing it a small margin of deformation before occupying its inextensible state.

With a view to limiting the amplitude of membrane deformation, the membrane can also be shaped so that its deformation is limited beyond a predetermined threshold by jamming.

In order to reinforce the firmness of fastening between the periphery of the membrane 14 and the rim of the hole 13, use can advantageously be made of one or more of the following measures:

the profile of the rim of the hole 13 can be given a shape which is not entirely cylindrical, e.g. bevelled and converging towards the outside, so that the rim constitutes a seat 17 for receiving the membrane, the shape of said seat itself preventing the membrane from becoming detached in an outward direction under the effect of the pressure of the liquid inside; and the periphery of the membrane can be extended by at least one projecting lip 18, 19, each of the lips overlapping a small strip of the base plate 2 along the rim of the hole 13.

Experience shows that the presence of the membrane 14 thus defined enables vibration of relatively small amplitude, corresponding to relatively high frequencies, to be damped very effectively.

In addition, locating said membrane within the base plate 2 allows said membrane to be relatively large in size, its area can easily achieve and even exceed 50 cm$^2$, and fixing the membrane by intimate bonding presents remarkable strength and leak-proofing, without it being necessary to resort to additional accessories such as rigid limiting grids or crimping flaps as provided in previously known embodiments.

We claim:

1. Hydraulic antivibration supports designed to be interposed between two rigid elements in order to damp vibratory motion between the two rigid elements, essentially along a main vibration direction (Z), the support comprising first and second rigid strength members (1, 2) suitable for securing to respective ones of the two rigid elements to be united, and an elastomer body (3) having a thick wall (4) interconnecting the two rigid strength members and partially defining a working chamber (A), said thick wall being substantially bell-shaped, extending along the main vibration direction between a peripheral base (4₁) secured to the second strength member (2) and a crown secured to the first strength member (1), said elastomer body further including a freely-deformable thin wall (5) which is integrally formed with the above-mentioned thick wall and which partially defines a compensation chamber (B) that is in communication with the working chamber via a narrow channel (C), the two chambers and the narrow channel being filled with a liquid, the second strength member (2) being a base plate which extends in a general plane that is substantially perpendicular to the main vibration direction and which has a "support" face secured in sealed manner with the elastomer body to co-operate therewith in defining the two chambers and the narrow channel, the hydraulic antivibration support being characterized in that the base plate (2) is pierced by a hole having a rim and (13) in communication with the atmosphere and facing the working chamber, the hole being closed in sealed manner by a flexible membrane (14) made of elastomer whose periphery is intimately bonded to the rim of the hole, the membrane being reinforced by a web (15)

made of non-deformable material that limits the displacement amplitude thereof.

2. A support according to claim 1, characterized in that the membrane (14) is formed so that deformation thereof is limited beyond a predetermined threshold by jamming.

3. A support according to any preceding claim, characterized in that the rim of the hole (13) is shaped, in particular by bevelling, so as to provide a membrane-receiving seat (17) which is not entirely cylindrical.

4. A support according to any preceding claim, characterized in that the periphery of the membrane (14) is extended by at least one lip (18, 19) that overlaps the rim of the hole (13).

* * * * *